US012287471B2

(12) United States Patent
Liang

(10) Patent No.: US 12,287,471 B2
(45) Date of Patent: Apr. 29, 2025

(54) CHROMATIC LIGHT SHEET MICROSCOPE

(71) Applicant: Arizona Board of Regents on Behalf of the University of Arizona, Tucson, AZ (US)

(72) Inventor: Rongguang Liang, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 476 days.

(21) Appl. No.: 17/638,592

(22) PCT Filed: Aug. 28, 2020

(86) PCT No.: PCT/US2020/048399
§ 371 (c)(1),
(2) Date: Feb. 25, 2022

(87) PCT Pub. No.: WO2021/041804
PCT Pub. Date: Mar. 4, 2021

(65) Prior Publication Data
US 2022/0291496 A1  Sep. 15, 2022

Related U.S. Application Data

(60) Provisional application No. 62/893,343, filed on Aug. 29, 2019.

(51) Int. Cl.
*G02B 21/06* (2006.01)
*G02B 21/00* (2006.01)
(Continued)

(52) U.S. Cl.
CPC ......... *G02B 21/06* (2013.01); *G02B 21/0008* (2013.01); *G02B 21/33* (2013.01); *G02B 21/365* (2013.01); *H04N 23/56* (2023.01)

(58) Field of Classification Search
None
See application file for complete search history.

(56) References Cited

U.S. PATENT DOCUMENTS 9,075,239 B2   7/2015  Kim
10,386,300 B2  8/2019  Wu et al.
(Continued)

OTHER PUBLICATIONS

International Search Report and Written Opinion mailed for International Patent Application No. PCT/US2020/048399.

*Primary Examiner* — Samira Monshi
(74) *Attorney, Agent, or Firm* — Perkins Coie LLP

(57) ABSTRACT

Methods, apparatus and systems that relate to a portable chromatic light microscope are described. One example chromatic light microscope includes a light source including light producing elements that produce non-monochromatic output light that can be modulated. The chromatic light microscope further includes an illumination subsection to receive light that is output from the light source. The illumination subsection includes one or more lenses to spatially disperse spectral contents of the light that is received by the illumination subsection and to deliver light having chromatic aberration to a target object. The chromatic light microscope also includes an imaging subsection that includes one or more lenses to receive scattered light from the target object and to deliver the same to a sensor, and a linear variable filter to selectively pass a portion of the light having a particular spectral range of wavelengths to the sensor.

26 Claims, 10 Drawing Sheets

(51) Int. Cl.
*G02B 21/33* (2006.01)
*G02B 21/36* (2006.01)
*H04N 23/56* (2023.01)

(56) References Cited

U.S. PATENT DOCUMENTS

2017/0059408 A1 3/2017 Körner et al.
2019/0258052 A1 8/2019 Fahrbach et al.
2021/0396981 A1* 12/2021 Kang ................... G01J 3/04

* cited by examiner

CHROMATIC LIGHT SHEET MICROSCOPE

RELATED APPLICATIONS

This patent document is a 371 National Phase Application of International Patent Application No. PCT/US2020/048399, filed Aug. 28, 2020, which claims priority to the provisional application with Ser. No. 62/893,343, titled "Chromatic Light Sheet Microscope," filed Aug. 29, 2019. The entire contents of the above noted applications are incorporated by reference as part of the disclosure of this document.

TECHNICAL FIELD

The disclosed technology relates generally to methods and devices to facilitate illumination and imaging in microscopes and more specifically to chromatic light microscopy methods, devices and systems in some embodiments.

BACKGROUND

Most high-resolution tissue imaging techniques, such as reflectance confocal microscopy (RCM), are point imaging techniques, which means that scanning mechanisms are needed to achieve lateral and axial imaging. Typically, the scanning system is complex, bulky, and expensive. Due to these limitations, most 3D imaging systems are neither portable nor handheld. In past few decades, a number of approaches that avoid using scanning-based systems have been investigated. However, these systems are still relatively complicated. Accordingly, there is still a need to produce a low-cost handheld imaging system.

SUMMARY OF CERTAIN EMBODIMENTS

The techniques disclosed herein can be implemented in various embodiments to achieve a portable chromatic light microscope.

One aspect of the disclosed embodiments relates to a chromatic light microscope that includes a light source comprising a plurality of light producing elements, each light producing element configured to produce non-monochromatic output light, each light producing element operable to produce a modulated output light. The chromatic light microscope further includes an illumination subsection to receive light that is output from the light source, the illumination subsection comprising one or more lenses that are configured to spatially disperse spectral contents of the light that is received by the illumination subsection and to deliver light having chromatic aberration to a target object. The chromatic light microscope also includes an imaging subsection comprising one or more lenses to receive scattered light from the target object and to deliver the scattered light to a digital sensor. The chromatic light microscope further includes a linear variable filter positioned to receive the scattered light prior to reaching the digital sensor and to selectively pass therethrough a portion of the light having a particular spectral range of wavelengths as a function of a position of the light that is incident thereon.

Another aspect of the disclosed embodiments relates to a chromatic light microscope that includes an illumination optics subsection to receive chromatic light from an arrayed light source, the illumination optics subsection comprising one or more lenses that are configured to spatially disperse spectral contents of the chromatic light that is received by the illumination optics subsection prior to delivery to a target object. The chromatic light microscope further includes an imaging optics subsection comprising one or more lenses to receive scattered light from the target object and to deliver the scattered light to a digital sensor. The chromatic light microscope also includes a prism positioned to receive light from the illumination optics subsection and to deliver light from the illumination optics subsection to the target object, the prism further positioned to receive scattered light from the target object and to deliver the scattered light to the imaging optics subsection. The chromatic light microscope further includes a linear variable filter positioned to receive light prior to reaching the digital sensor and to selectively pass therethrough light having a particular spectral range of wavelengths as a function of a position of light that is incident thereon.

DETAILED DESCRIPTION

Figure 1:
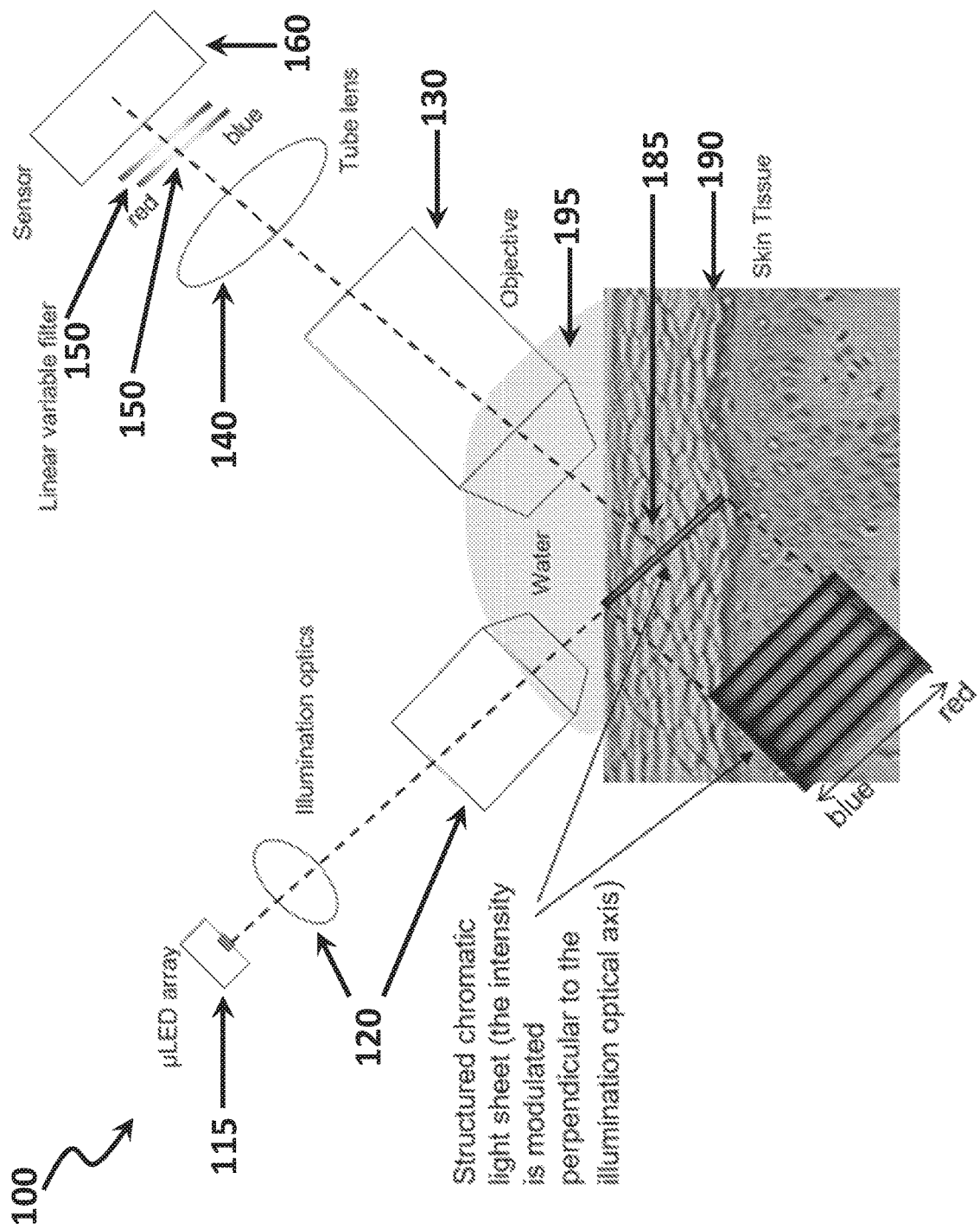
FIG. 1 illustrates a V-type layout of a chromatic light sheet microscope in accordance with an example embodiment.

The techniques disclosed herein overcome the shortcomings of prior systems and can be implemented in various embodiments to provide a low-cost handheld imaging system. The disclosed devices and systems, among other features and benefits, address the need for a low-cost, handheld imaging systems that can be used for detecting and diagnosing epithelial diseases by providing a structured chromatic light sheet microscope that uses an arrayed light source (e.g., a microLED (µLED)) to generate the chromatic light sheet and utilizes chromatic slit confocal detection to remove the out-of-the-light-sheet scattered light.

Light sheet imaging is used in various applications, but mostly in fluorescence imaging, due to its high spatio-temporal resolution, large field of view (FOV), and low phototoxicity. In almost all of the applications, fluorophores are excited with a sheet of laser light and so the sample is optically sectioned. In recent years, light sheet imaging has also been applied to measure the scattered light orthogonally to the illuminating light sheet. One major challenge is how to produce a long and thin light sheet, which is determined by the illumination optics. Some of the disclosed embodiments address this challenge by developing a chromatic light sheet and expanding the length of the light sheet by using components that introduce chromatic aberration. Using this technique, deep tissue image resolution and contrast can be improved by focusing the longer wavelengths light of the sheet deeper inside the tissue with less light scattering.

Optical sectioning microscopy was first introduced to eliminate the out-of-focus scattered light in wide-field microscopy. By simply projecting three phase-shifted structured patterns on the tissue and processing three wide-field tissue images modulated by the phase-shifted structured patterns, an optically sectioned image can be extracted in real-time. The axial resolution of optical sectioning microscopy can be as good as that of the confocal microscope. The disclosed embodiments provide adaptations of this technique that can be used with chromatic light sheet illumination, in which by modulating the intensity along the light sheet, the lateral resolution of the light scattering imaging can be enhanced. In one example implementation, a 2D μLED array can be used to produce volumetric structured chromatic light sheet without using moving parts.

Typically, laser light is used to create light sheets due to its high power and coherence properties. However, this approach has several limitations. First, the laser light source is relatively bulky; thus, it is not suitable for handheld applications. Second, it is not easy to modulate the laser light to create a structured light sheet. The third issue is laser speckle. Another limitation with lasers is that they are single wavelength light sources; thus, they are not suitable for producing chromatic light sheets. These shortcomings are addressed by the disclosed embodiments that use an arrayed light source (e.g., a μLED array) to generate structured chromatic light sheet. For example, a flat panel display can be used that includes arrays of micro LEDs that form the individual pixel elements. The μLED array acts as thousands of point sources that can be controlled at kilohertz frequency. Further, brightness can be very high via pulse width modulation. Each individual μLED in the array can be individually controlled with pulse width modulation at high speed. With current state of the art in fabrication technologies, the pixels can be as small as 3 μm, and thus up to 1920×1080 pixels can be included, and each pixel can be converted to a different spectrum.

Small μLED arrays have good spatial coherence. Using a white μLED array and illumination optics with chromatic aberration, thin structured chromatic light sheets can be generated. By modulating the intensity of the μLED array, a structured chromatic light sheet (with intensity that is modulated across the illumination optical axis) at high speed with continuously adjustable frequencies can be generated. By modulating the consecutive raw of 2D μLED array, we can generate structured chromatic light sheets at different depths and obtain 3D volumetric image without moving elements.

In confocal imaging systems, a detection pinhole or slit is needed to block the out-of-focus light. For widefield imaging, out-of-focus light cannot be removed in that way. By taking advantage of the disclosed chromatic light sheet illumination approach, we can block the out-of-the-light-sheet light following the chromatic slit confocal detection using a linear variable filter (chromatic slit confocal detection). Linear variable filters are bandpass filters that have spectral variation in wavelength or bandwidth across one linear direction of the filter. In the disclosed imaging techniques, one linear variable filter can be placed close to the sensor so that only the light with the best focus wavelength passes through the linear variable filter and reaches the sensor. Using a linear variable filter (or filters), the chromatic slit is inherently built into the system across the entire field of view (FOV). In some embodiments, two linear variable filters can be used that are positioned on top of one another with a relative lateral shift to reduce the width of the passband and to improve the out-of-the-light-sheet stray light rejection. With a 2D μLED array, an array of structured chromatic light sheets can be generated along the imaging optical axis, allowing for enhanced axis resolution.

FIG. 1 illustrates a V-type layout of the chromatic light sheet microscope 100 in accordance with an example embodiment. The microscope includes a light sheet illumination subsystem and an imaging subsystem with chromatic slit detection. In the depicted example, both subsystems are water (195) immersion subsystems to minimize the impact of uneven tissue thickness and unsmooth tissue surface. With reference to FIG. 1, the arrayed light source 115 provides a plurality of light beams to the illumination optics 120 that produces a spectrally stretched light sheet 185 at the tissue 190. The spectral span of the light sheet 185 is further illustrated below the light sheet and, in this example, includes a range of wavelengths from blue to red. The imaging subsection, including the objective 130, the tube lens 140, one or more linear variable filters 150, and the sensor/detector 160, receive the scattered chromatic light, as will be described in further detail below.

The V-type configuration of FIG. 1 may not be optimal for all clinical applications but is easy to implement and evaluate. The disclosed embodiments can be further implemented in other configurations, such as a handheld version, which, as will be described further, includes a coupling prism to combine the two subsystems and fold the illumination optical path so that the system is compact enough for clinical applications.

It should be noted that in the figures of the present document, the labels "red" and "blue" are provided for illustration purposes to facilitate the understanding of the underlying principles, and are not intended to limit or restrict the disclosed embodiments to a particular spectral range. It should be further noted that while, for simplicity of explanation, the same reference numbers have been used to identify some of the elements in different figures (e.g., prism 197 in FIGS. 4 and 5), it is understood that this designation does not necessarily mean that those elements are identical. In particular, one or more characteristics of the elements (e.g., optical, material, dimension, etc.) are contemplated to be modified based on the particular microscope configuration and the desired performance characteristics.

Figure 2A:
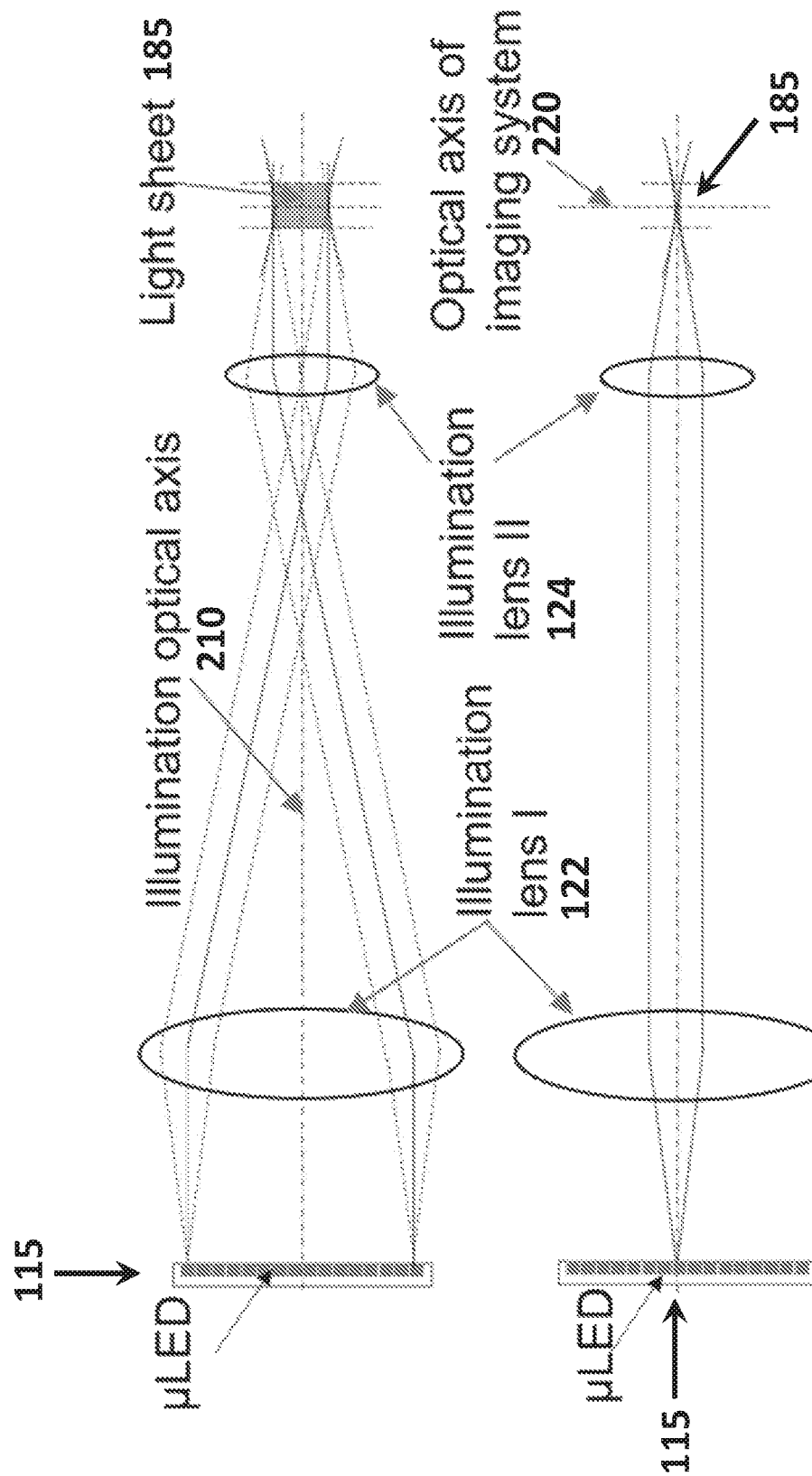
FIG. 2A illustrates generating a light sheet from a linear array of micro Light-Emitting Diodes (µLEDs).

Chromatic Light sheet illumination subsystem: FIG. 2A illustrates generating the light sheet from a linear array of μLEDs 115 (the top and the bottom sections of FIG. 2A illustrate two orthogonal perspectives when a single row of μLEDs is turned on). The light from μLEDs 115 is first collimated by the illumination lens I (122) and then focused to form a light sheet by the illumination lens II (124). In some implementations, because there are small gaps between μLEDs, the μLED array 115 can be defocused slightly so that the focused light sheet is continuous. In one example, where the size of μLED is 10×10 μm and the magnification of the illumination optics is 0.2×, the smallest thickness of the light sheet is about 2 μm (assuming the numerical aperture (NA) of the illumination optics II (124) is 0.1), and the thickness across the light sheet should be less than 5 μm over a focus range of 30 μm for a single wavelength. The width of the light sheet is about 1.5 mm.

Figure 2B:
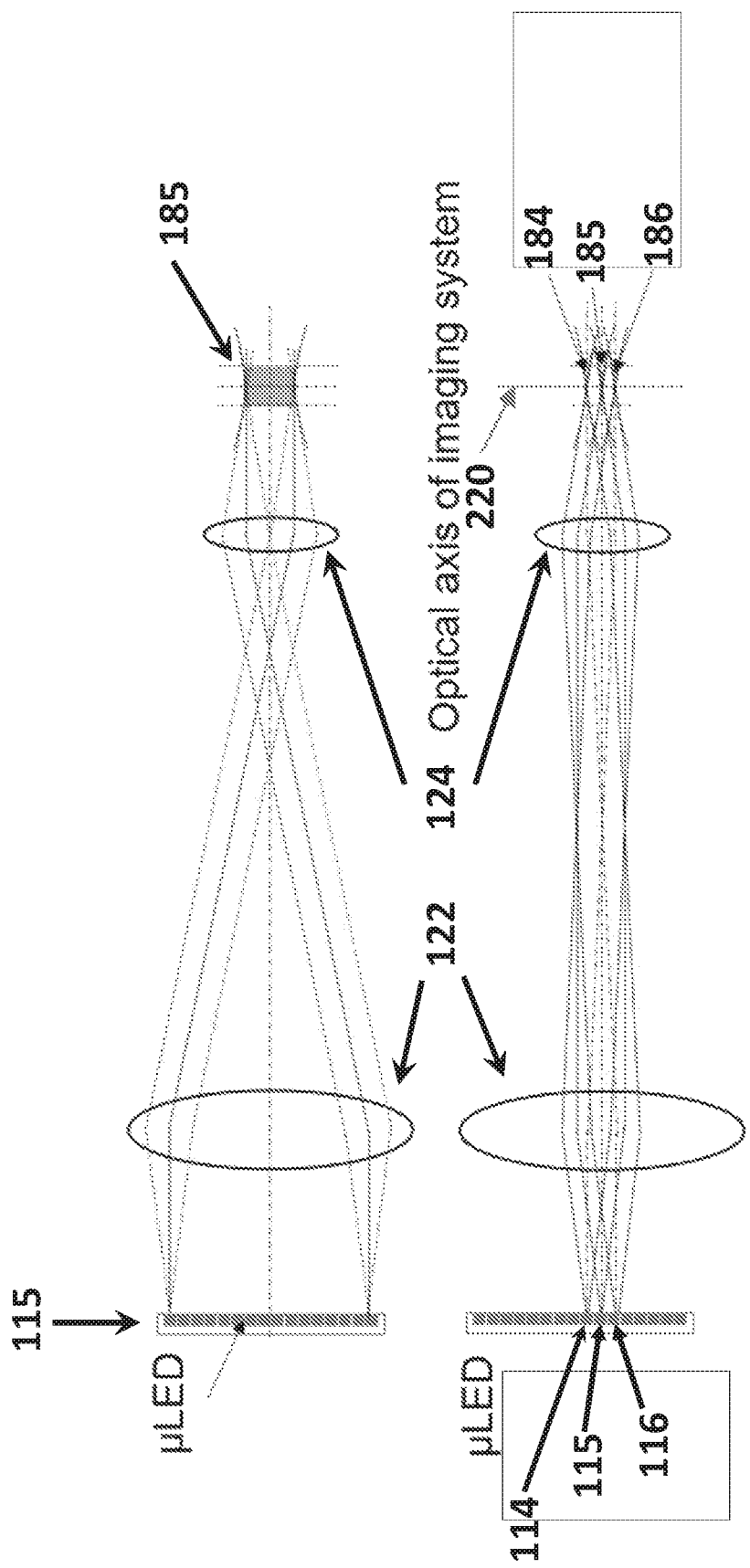
FIG. 2B illustrates an example configuration for generating multiple light sheets using different rows of µLEDs.

FIG. 2B illustrates how multiple light sheets (3 light sheets 184, 185, and 186 in FIG. 2B) can be generated with different rows of µLEDs (114, 115, and 116 in FIG. 2B, respectively). With 10 µm µLED size and the same illumination optics as above, the distance between the centers of the light sheets is 2 µm; this distance can be adjusted by turning ON the alternative row of µLEDs. Only one linear row of µLEDs is turned ON during imaging. This capability can be used to increase the depth resolution.

Figure 2C:
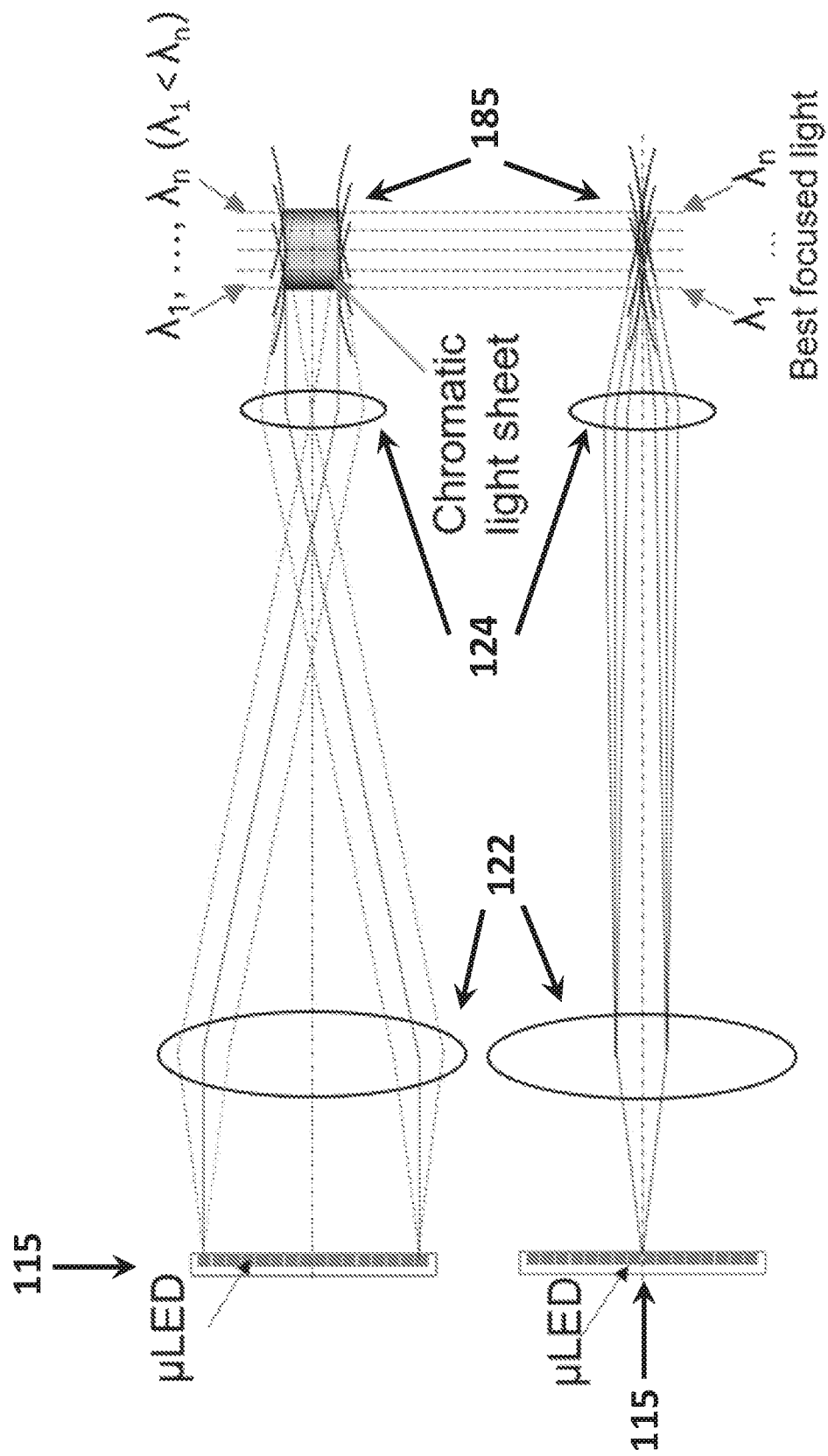
FIG. 2C illustrates an example configuration for generating a chromatic light sheet with chromatic illumination optics.
Figure 2D:
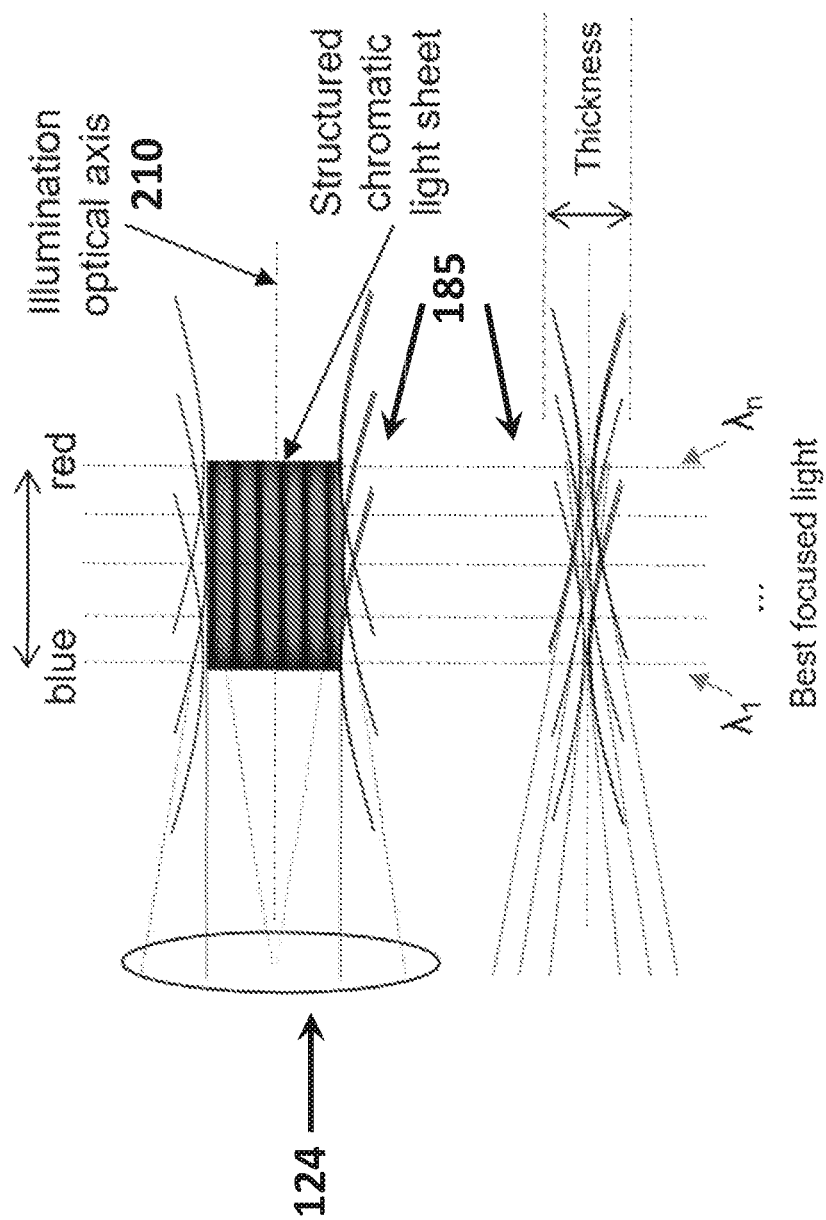
FIG. 2D illustrates an example configuration for generating a structured light sheet having sinusoidal modulation of light intensity across the light sheet.

FIG. 2C illustrates how to generate a chromatic light sheet with chromatic illumination optics. In this configuration, the illumination optics is specially designed to focus the light with different wavelengths at different depths; for example, the short wavelength (blue, $\lambda_1$) comes to focus closer to the lens 124, and long wavelength (red, $\lambda_n$) comes to focus further from the lens 124. Such chromatic aberration characteristics can be obtained by selecting the proper dispersive material (e.g., having an index of refraction that is a function of wavelength) for one or both of the lenses 122 and 124 in the illumination optics subsection. Because the resulting light sheet is the overlap of many light sheets with different wavelengths, the overall thickness will be much larger, as illustrated at the bottom section of FIG. 2D, compared to a light sheet composed of a single wavelength or a light sheet generated by illumination optics with corrected chromatic aberrations. As will be discussed for the imaging subsystem with chromatic slit confocal detection, the detection width of the chromatic light sheet becomes thinner because out-of-the-light-sheet scattered light will be blocked.

FIG. 2D illustrates another key feature of the disclosed chromatic light sheet microscope in that with the addressable µLED array, the µLEDs can be modulated to generate a structured light sheet having sinusoidal modulation of light intensity (with tunable frequency) across the light sheet (the modulation is perpendicular to the illumination optical axis 210). The lateral and depth resolutions can be significantly improved by using three phase-shifted light sheets. It should be noted that certain features in FIGS. 2A to 2D are exaggerated for illustration purposes.

Figure 3:
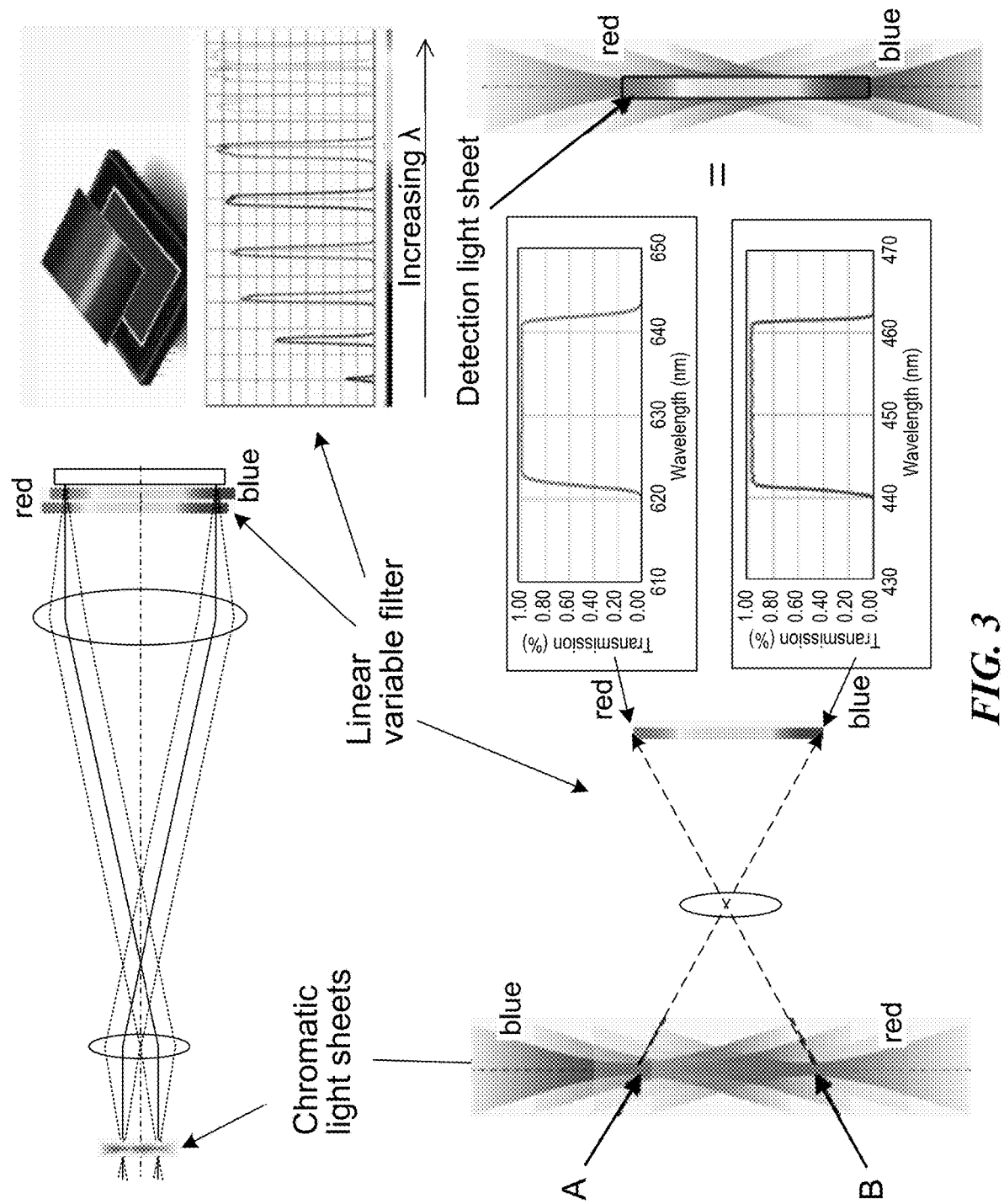
FIG. 3 illustrates an example configuration of an imaging subsystem with chromatic slit confocal detection.

Imaging subsystem h chromatic slit confocal detection: FIG. 3 illustrates an example configuration of the imaging subsystem with chromatic slit confocal detection. The chromatic light sheets are imaged onto the sensor 160 and filtered through the linear variable filter 150 placed in front of the sensor. The linear variable filter 150 is a unique edge filter; as shown in the example transmission curve characteristic 155 of a linear variable filter shown in FIG. 3, linear variable filter only transmits a narrow band of wavelengths at each location. If a narrower bandwidth or tunable bandwidth is needed, two linear variable filters can be assembled together as in FIG. 1 or top portion of FIG. 3). The transmitted bandwidth is tunable by slightly moving the two filters relative to each other. As shown in the bottom half of FIG. 3, point A, where the blue light sheet has the smallest thickness, is imaged onto the location of the linear variable filter where the filter has a narrow transmission bandwidth at the corresponding blue wavelength. Similarly, point B, where the red light sheet has the smallest thickness, is imaged onto the location of the linear variable filter where the filter has a narrow transmission bandwidth in the corresponding red wavelength. Therefore, at each location along the illumination plane, only the light from the thinnest light sheet reaches the sensor. The sensor only detects the light from the detection light sheet as shown in the bottom right section of FIG. 3. The light outside the light sheet plane is blocked by the linear variable filter, which acts as a chromatic confocal detection slit. As noted above, two linear variable filters can be coupled together at slightly shifted positions to increase the rejection of the light at different wavelengths outside the light sheet illumination plane (also the imaging plane of the imaging subsystem).

Structured light sheet illumination and imaging: Structured light techniques have been widely used in tissue imaging to improve the imaging section. In accordance with the disclosed embodiments, and as shown, for example, in FIG. 2D, with an addressable µLED array, it becomes extremely easy to generate a structured chromatic light sheet with a sinusoidal intensity modulation across the illumination optical axis 210 by tuning the driving current to each µLED. One key feature is that the frequency of the structured light pattern can be tunable with an addressable µLED array. By shifting the structured light sheet three times with 120 degrees phase shift and obtaining three phase-shifted images, high resolution section image can be obtained from the following equation:

$$I_s \sim \sqrt{(I_1-I_2)^2+(I_2-I_3)^2+(I_3-I_1)^2},$$

where $I_1$, $I_2$, and $I_3$ are three phase-shifted images with 120 degrees of phase shift between them.

The following example further illustrates how the three phase-shifted intensity modulated light beams can be generated using the µLED array. Assuming that only one row of the array having a plurality of elements is used for illumination, at time T1, the intensity values of each of the, e.g., 100 elements can be set to produce a first sinusoidal pattern (e.g., element 1 is turned on at 100% intensity; element 2 at 90%, element 3 at 80%, etc.). At time T2, the intensity pattern of the elements is changed to produce a second sinusoidal pattern (e.g., element 1 is turned on at 65% intensity; element 2 at 55%, element 3 at 45%, etc.). At time T3, the intensity pattern of the elements is changed yet again to produce a third sinusoidal pattern (e.g., element 1 is turned on at 35% intensity; element 2 at 25%, element 3 at 15%, etc.), and so on. Thus, sinusoidal patterns with different relative shifts can be produced.

Enhanced axial and volumetric imaging: Another key feature of the disclosed embodiments relates to enhanced axial imaging, which is accomplished by projecting structured light sheets at different depths along the imaging optical axis 220 as shown in, e.g., FIG. 2B with 2D µLED array. The smallest distance between the light sheets is determined by the period of the 2D µLED array and the illumination optics. For the example system described earlier, the distance is 2 µm, which means the axial resolution is ~2 µm. Volumetric images can be reconstructed by taking sequential depth images. If the imaging depth is beyond the depth of field of the detection objective, a tunable lens can be added to the imaging subsystem.

Figure 4:
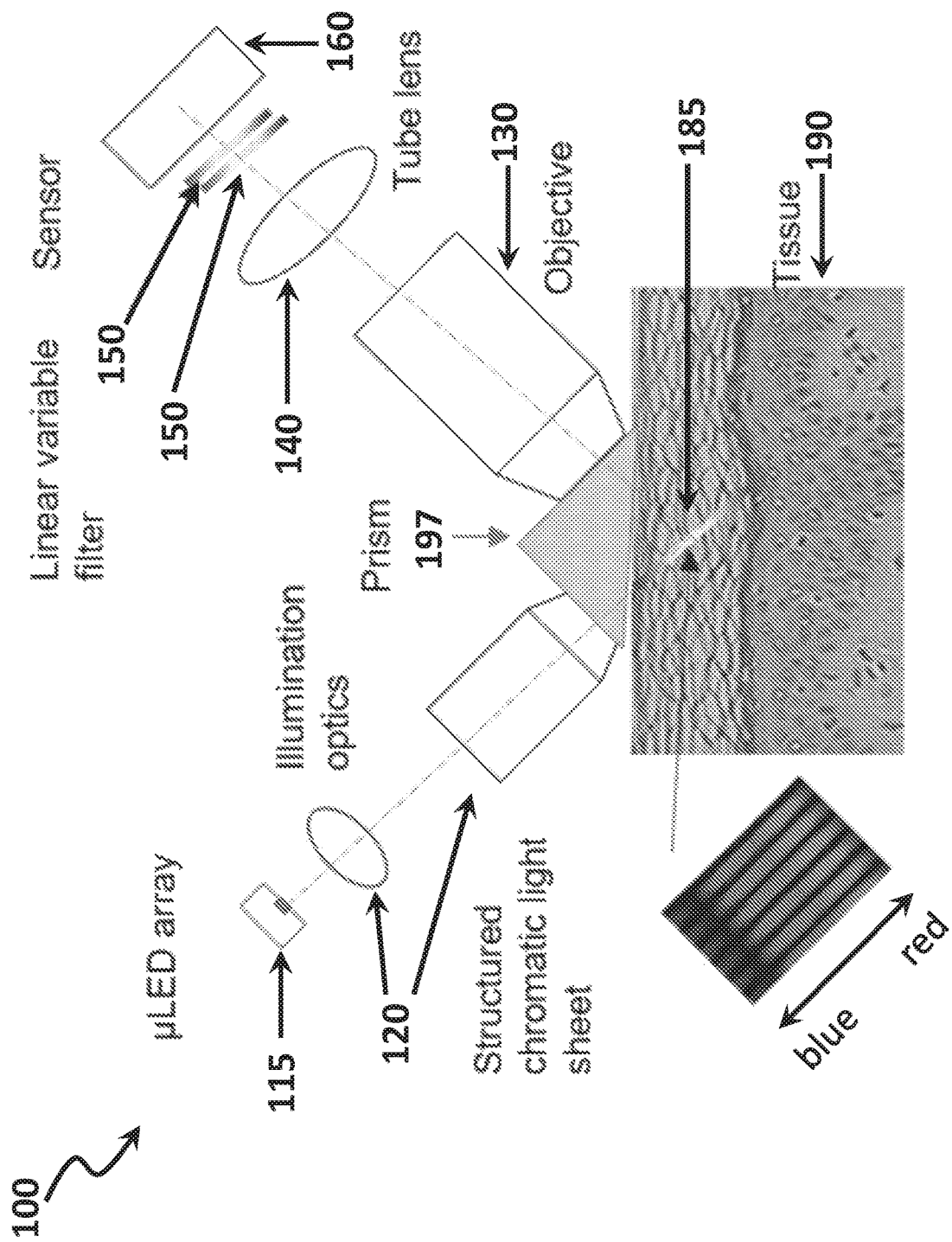
FIG. 4 illustrates a configuration of a chromatic light sheet microscope in accordance with an example embodiment.

FIG. 4 illustrates another configuration of the chromatic light sheet microscope 100 in accordance with an example embodiment. In the configuration of FIG. 4, a prism 197 is positioned such that a facet of the prism is placed flat on top of the tissue 190. In this configuration, the need for immersion in water is reduced or eliminated. While there may still be a need to provide a small amount of water (or appropriate fluid or gel) between the face of the prism and the skin tissue, there is no need for full immersion in water. While the prism 197 can introduce certain additional aberrations, these aberrations can be accounted for when designing the system. To reduce surface scratch, the prism can be made from Sapphire glass, one of the hardest optical materials. The edge of the prism can be polished to form a round edge for safety considerations.

Figure 5:
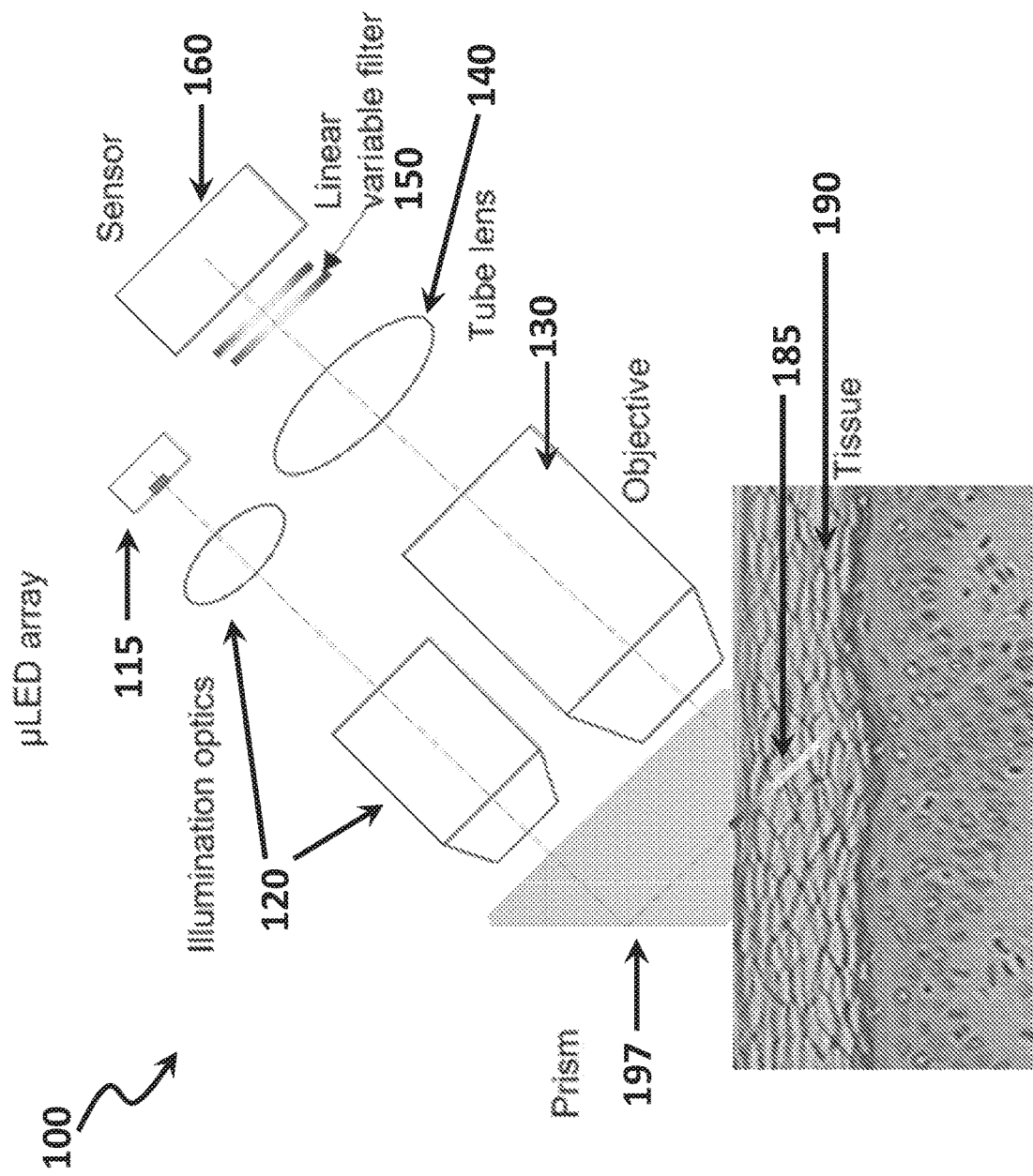
FIG. 5 illustrates another configuration of a chromatic light sheet microscope in accordance with an example embodiment.

FIG. 5 illustrates another configuration of the chromatic light sheet microscope 100 in accordance with an example embodiment. In the configuration of FIG. 5, a prism 197 is used to couple the illumination and imaging subsystems. Compared to the system in FIG. 1, and similar to configuration of FIG. 4, the system in FIG. 5 considerably simplifies the use of the system for clinical applications as only a thin layer of water may be needed between the tissue and prism. In addition, optical axes of the illumination and the imaging subsystems are collinear, which provides for a more compact configuration, and allows implementation where it is not possible to utilize a V-type configuration. Another feature of the configurations of FIGS. 4 and 5 is that the prism can be used to press upon and flatten the skin, which can result in better image quality.

Figure 6:
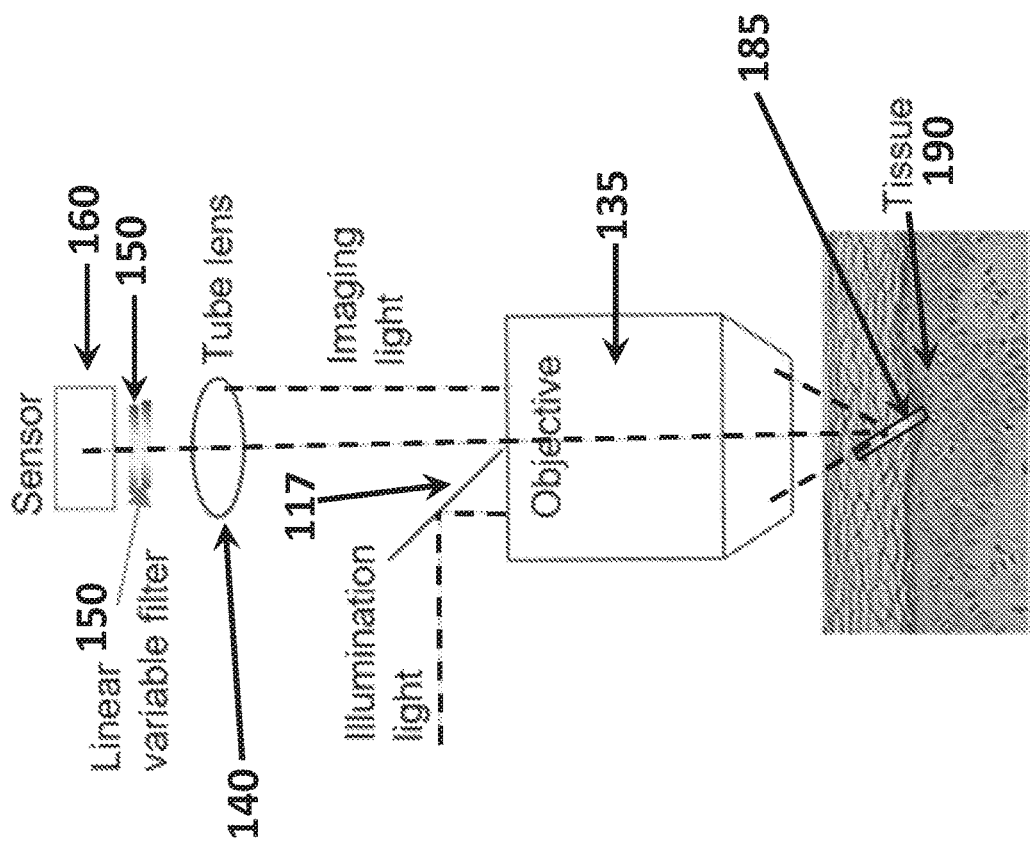
FIG. 6 illustrates yet another configuration of a chromatic light sheet microscope in accordance with an example embodiment.

FIG. 6 illustrates yet another configuration of the chromatic light sheet microscope 100 in accordance with an example embodiment. In the configuration of FIG. 6, a single objective 135 is used for both illumination and imaging subsystems. The illumination light is provided to the objective lens via a reflecting surface 117; the light scattered from the tissue 190 is collected by the objective 135 and is provided to the tube lens 140, to the linear variable filter 150 and then to the sensor 160. This configuration provides a compact form factor and can be beneficially used where illumination/imaging from an overhead angle is possible or is preferred.

Figure 7:
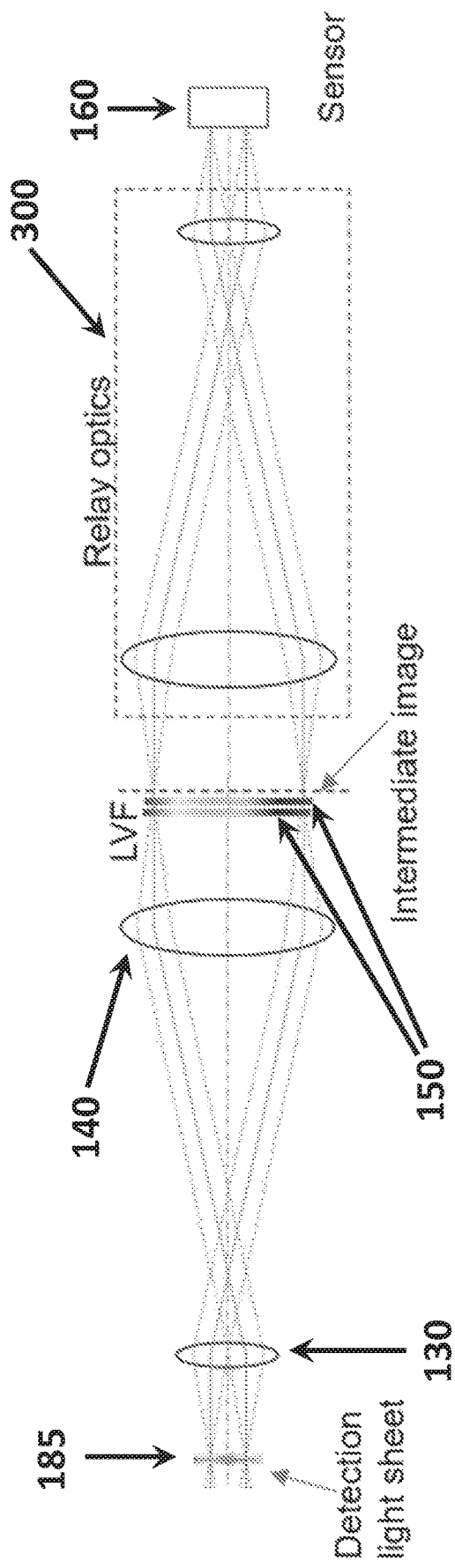
FIG. 7 illustrates an imaging subsystem for a chromatic light sheet microscope in accordance with an example embodiment.

FIG. 7 illustrates an imaging subsystem for a chromatic light sheet microscope 100 in accordance with an example embodiment. In prior configurations, a linear variable filter (LVF) is used. Currently, LVFs are typically manufactured in large formats due to technical difficulties associated with their fabrication and production. As a result, a corresponding sensor that is used for detecting the light that passes through the LVF must also be large, which can make the imaging speed relatively low for some applications. The configuration in FIG. 7 provides an alternate embodiment that deploys a relay optics section 300, which is designed to image the larger-size LVF onto a smaller-size sensor. As such, a camera with a smaller sensor (and therefore faster sensor) can be used.

The disclosed embodiments provide several features and benefits including the use of chromatic slit confocal detection with chromatic light sheet illumination to improve the image resolution and contrast over a large imaging depth. In the illumination path, long wavelength light is focused deeper inside the tissue and can form a thin light sheet due to less light scattering and absorption. Further, the out-of-the-light-sheet scattered light in the imaging path will be blocked by the linear variable filter(s) so that most of the light reaching the sensor is from the in-focus light sheet. This configuration will significantly improve the image resolution and contrast.

Another feature relates to the use of a dynamically addressable μLED array to generate the structured chromatic light sheet (with tunable frequency) without using an external light source and scanner, dramatically simplifying the structured light and light sheet illumination system. These advances would overcome a major barrier to translating the concept of structured illumination and light sheet illumination to the clinic for skin and oral cancer detection and diagnosis. Further, 2D μLED array can be used to generate 3D chromatic light sheet for volumetric imaging as well.

However, for some applications, a dynamically addressable μLED array may not have a high enough power and the spectral bandwidth of the array may not meet the needs of those applications. In these cases, the disclosed configurations of structured chromatic light sheet and chromatic slit detection can be used with other types of light sources and spatial light modulators. For example, a continuous wave (CW) or a pulse light source, such as a supercontinuum laser, can provide uniform illumination to the spatial light modulator, such as a digital micromirror device (DMD) or a liquid crystal modulator, which modulates the light to create structured chromatic light sheet as discussed above. The illumination optics and imaging system can remain the same as that for μLED array.

Yet another feature of the disclosed embodiments relates to use of a μLED array and CMOS sensor in the disclosed systems which can be potentially operated with a battery and smart phone. With mobile phone networks, field workers can screen high-risk populations in remote regions, send images with notes to specialists, refer patients to specialists, and convey the diagnostic results to the patients, significantly reducing disease progression and death rates from cancer and improving quality of life in low and middle income countries and low resource regions.

One aspect of the disclosed technology relates to a chromatic light microscope that includes a light source comprising a plurality of light producing elements, where each light producing element is configured to produce non-monochromatic output light, and each light producing element is operable to produce a modulated output light. The chromatic light microscope further includes an illumination subsection to receive light that is output from the light source, where the illumination subsection includes one or more lenses that are configured to spatially disperse spectral contents of the light that is received by the illumination subsection and to deliver light having chromatic aberration to a target object. The chromatic light microscope additionally includes an imaging subsection that includes one or more lenses to receive scattered light from the target object and to deliver the scattered light to a digital sensor. The chromatic light microscope also includes a linear variable filter that is positioned to receive the scattered light prior to reaching the digital sensor and to selectively pass therethrough a portion of the light having a particular spectral range of wavelengths as a function of a position of the light that is incident thereon.

In an example embodiment of the chromatic light microscope, the light delivered to the target object comprises one or more light sheets having spectrally dispersed chromatic sections that are positioned across the light sheet. In some example embodiments, the spectrally dispersed chromatic sections spread contiguously across the light sheet. According to another example embodiment, the light source is one of: a micro LED array or an organic LED array. In some example embodiments, the light source is one of: a combination of a continuous wave (CW) light source and a spatial light modulator; or a combination of a pulse light source and a spatial light modulator.

In an example embodiment, the spatial light modulator is one of a digital micromirror device (DMD) or a liquid crystal light modulator. In another example embodiment, the pulse light source is a supercontinuum laser. In yet another example embodiment, the light source is an arrayed light source, the plurality of light producing elements form a plurality of rows and columns, and each of the light producing elements is independently controllable. In an example embodiment, each of the light producing elements is configured to (a) be turned on or off, or (b) produce an output having a variable intensity. In still another example embodiment, the arrayed light source is configured to produce illumination from one row or one column of the light producing elements at a given time instance for illumination of the target object.

In some example embodiments, the arrayed light source is configured to produce illumination from two or more rows or two or more columns of the light producing elements at corresponding two or more time instances for illumination of the target object. In one example embodiment, illumination produced from each row of the arrayed light source is intensity modulated. In another example embodiment, the linear variable filter is positioned to pass, from each section thereof, a focused light having an associated spectral content and having a narrow beam width at that section of the linear variable filter, and to block out-of-focus light that is incident thereupon. In yet another example embodiment, the chromatic light microscope includes one or more additional linear variable filters positioned on a side of the linear variable filter to further narrow the spectral range of light that passes through a combination of the linear variable filter and the additional one or more additional linear variable filters.

According to another example embodiment, the chromatic light microscope includes the digital sensor that is configured to receive light that is output from the linear variable filter and to produce information for obtaining a volumetric image of the target object. In some example embodiments, the digital sensor is configured to receive a plurality of phase shifted optical signals and to produce: a plurality of phase-shifted images or section images of the target object. In another example embodiment, the illumination subsection is configured to produce illumination at a first oblique angle with respect to a normal plane that passes through the target object, and the imaging subsection is configured to receive the scattered light from the target object at a second oblique angle. In yet another example embodiment, the illumination subsection is configured to illuminate the target object from a first side and the imaging subsection is configured to receive the scattered light from a second side of the normal plane. In still another example embodiment, the illumination subsection is configure to illuminate the target object from a first side and the imaging subsection is configured to receive the scattered light from the first side of the normal plane.

In another example embodiment, the illumination section is configured to produce illumination from an overhead position with respect to the target object and the imaging section is configured to receive the scattered light from the target object at the overhead position. In some example embodiments, an end of each of the illumination and the imaging subsections that is closer to the target object is immersed in a fluid. In an example embodiment, the chromatic light microscope includes a prism positioned to interface the illumination subsection, the imaging subsection and at least a portion of the target object. In this embodiment, the prism is positioned to deliver light from the illumination subsection to the target object, and to deliver the scattered light from the target object to the imaging subsection. In some example embodiments, a flat facet of the prism is positioned to interface with the target object. In another example embodiment, the flat facet of the prism is configured to interface with the target object through a fluid. In another example embodiment, the chromatic light microscope includes a relay optics subsection positioned to receive light after passing through the linear variable filter before reaching the digital sensor; the relay optics section includes one or more lenses to produce a de-magnified image on the digital sensor.

Another aspect of the disclosed technology relates to a chromatic light microscope that includes: an illumination optics subsection to receive chromatic light from an arrayed light source, where the illumination optics subsection includes one or more lenses that are configured to spatially disperse spectral contents of the chromatic light that is received by the illumination optics subsection prior to delivery to a target object. The chromatic light microscope further includes an imaging optics subsection that includes one or more lenses to receive scattered light from the target object and to deliver the scattered light to a digital sensor. The chromatic light microscope additionally includes a prism positioned to receive light from the illumination optics subsection and to deliver light from the illumination optics subsection to the target object. The prism is positioned to receive scattered light from the target object and to deliver the scattered light to the imaging optics subsection. The chromatic light microscope also includes a linear variable filter that is positioned to receive light prior to reaching the digital sensor and to selectively pass therethrough light having a particular spectral range of wavelengths as a function of a position of light that is incident thereon.

It is understood that the various disclosed embodiments may be implemented individually, or collectively, in devices comprised of various optical components, electronics hardware and/or software modules and components. These devices, for example, may comprise a processor, a memory unit, an interface that are communicatively connected to each other, and may range from desktop and/or laptop computers, to mobile devices and the like. The processor and/or controller can perform various disclosed operations based on execution of program code that is stored on a storage medium. The processor and/or controller can, for example, be in communication with at least one memory and with at least one communication unit that enables the exchange of data and information, directly or indirectly, through the communication link with other entities, devices and networks. The communication unit may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information. For example, the processor may be configured to receive electrical signals or information from the disclosed sensors (e.g., CMOS sensors), and to process the received information to produce images or other information of interest.

Various information and data processing operations described herein may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media that is described in the present application comprises non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. While operations are depicted in the drawings in a particular order, this should not be understood as requiring that such operations be performed in the particular order shown or in sequential order, or that all illustrated operations be performed, to achieve desirable results. The features of the embodiments described herein may be combined in all possible combinations of methods, apparatus, modules, and systems.

What is claimed is:

1. A chromatic light microscope, comprising:
  a light source comprising a plurality of light producing elements, each light producing element configured to produce non-monochromatic output light, each light producing element operable to produce a modulated output light;
  an illumination subsection to receive light that is output from the light source, the illumination subsection comprising one or more lenses that are configured to spatially disperse spectral contents of the light that is received by the illumination subsection and to deliver light having chromatic aberration to a target object;
  an imaging subsection comprising one or more lenses to receive scattered light from the target object and to deliver the scattered light to a sensor; and
  a linear variable filter positioned to receive the scattered light prior to reaching the sensor and to selectively pass therethrough a portion of the light having a particular spectral range of wavelengths as a function of a position of the light that is incident thereon, wherein the chromatic light microscope further comprises one or more additional linear variable filters positioned on a side of the linear variable filter to further narrow the spectral range of light that passes through one or more spatial positions of a combination of the linear variable filter and the additional one or more additional linear variable filters.

2. The chromatic light microscope of claim 1, wherein the light delivered to the target object comprises one or more light sheets having spectrally dispersed chromatic sections that are positioned across the light sheet.

3. The chromatic light microscope of claim 2, wherein the spectrally dispersed chromatic sections spread contiguously across the light sheet.

4. The chromatic light microscope of claim 1, wherein the light source is one of: a micro light emitting device (LED) array or an organic LED array.

5. The chromatic light microscope of claim 1, wherein the light source is one of:
  a combination of a continuous wave (CW) light source and a spatial light modulator; or
  a combination of a pulse light source and a spatial light modulator.

6. The chromatic light microscope of claim 5, wherein the spatial light modulator is one of a digital micromirror device (DMD) or a liquid crystal light modulator.

7. The chromatic light microscope of claim 5, wherein the pulse light source is a supercontinuum laser.

8. The chromatic light microscope of claim 1, wherein the light source is an arrayed light source, the plurality of light producing elements form a plurality of rows and columns, and each of the light producing elements is independently controllable.

9. The chromatic light microscope of claim 8, wherein each of the light producing elements is configured to (a) be turned on or off, or (b) produce an output having a variable intensity.

10. The chromatic light microscope of claim 8, wherein the arrayed light source is configured to produce illumination from one row or one column of the light producing elements at a given time instance for illumination of the target object.

11. The chromatic light microscope of claim 8, wherein the arrayed light source is configured to produce illumination from two or more rows or two or more columns of the light producing elements at corresponding two or more time instances for illumination of the target object.

12. The chromatic light microscope of claim 10, wherein illumination produced from each row of the arrayed light source is intensity modulated.

13. The chromatic light microscope of claim 1, wherein the linear variable filter is positioned to pass, from each section thereof, a focused light having an associated spectral content and having a narrow beam width at that section of the linear variable filter, and to block out-of-focus light that is incident thereupon.

14. The chromatic light microscope of claim 1, further comprising the sensor that is configured to receive light that is output from the linear variable filter and to produce information for obtaining a volumetric image of the target object.

15. The chromatic light microscope of claim 14, wherein the sensor is configured to receive a plurality of phase shifted optical signals and to produce information representing: a plurality of phase-shifted images or section images of the target object.

16. The chromatic light microscope of claim 1, wherein the illumination subsection is configured to produce illumination at a first oblique angle with respect to a normal plane that passes through the target object, and the imaging subsection is configured to receive the scattered light from the target object at a second oblique angle.

17. The chromatic light microscope of claim 16, wherein the illumination subsection is configured to illuminate the target object from a first side and the imaging subsection is configured to receive the scattered light from a second side of the normal plane.

18. The chromatic light microscope of claim 16, wherein the illumination subsection is configured to illuminate the target object from a first side and the imaging subsection is configured to receive the scattered light from the first side of normal plane.

19. The chromatic light microscope of claim 1, wherein the illumination section is configured to produce illumination from an overhead position with respect to the target object and the imaging section is configured to receive the scattered light from the target object at the overhead position.

20. The chromatic light microscope of claim 1, wherein an end of each of the illumination and the imaging subsections that is closer to the target object is immersed in a fluid.

21. The chromatic light microscope of claim 1, further comprising a prism positioned to interface the illumination subsection, the imaging subsection and at least a portion of the target object, wherein the prism is positioned to deliver light from the illumination subsection to the target object, and to deliver the scattered light from the target object to the imaging subsection.

22. The chromatic light microscope of claim 20, wherein a facet of the prism is positioned to interface with the target object.

23. The chromatic light microscope of claim 22, wherein the facet of the prism is configured to interface with the target object through a fluid.

24. The chromatic light microscope of claim 1, further comprising a relay optics subsection positioned to receive light after passing through the linear variable filter before reaching the sensor, the relay optics subsection comprising one or more lenses to produce a de-magnified image on the sensor.

25. A chromatic light microscope, comprising:
an illumination subsection configured to receive light from a light source that includes a plurality of light producing elements, wherein each light producing element is configured to produce non-monochromatic modulated output light, the illumination subsection comprising one or more lenses that are configured to spatially disperse spectral contents of the light that is received by the illumination subsection and to deliver light having chromatic aberration to a target object;
an imaging subsection comprising one or more lenses to receive spatially dispersed, multi-chromatic scattered light from the target object and to deliver the spatially dispersed, multi-chromatic scattered light to a sensor; and
a linear variable filter positioned to receive the spatially dispersed, multi-chromatic scattered light prior to reaching the sensor and to selectively pass therethrough a portion of the light having a particular spectral range of wavelengths as a function of a position of the light that is incident thereon, wherein the imaging subsection excludes any dispersion elements for spatial separation of spectral components of light traveling through the imaging subsection.

26. A chromatic light microscope, comprising:
a light source comprising a plurality of light producing elements, each light producing element configured to produce non-monochromatic output light, each light producing element operable to produce a modulated output light;
an illumination subsection to receive light that is output from the light source, the illumination subsection comprising one or more lenses that are configured to spatially disperse spectral contents of the light that is received by the illumination subsection and to deliver light having chromatic aberration to a target object;
an imaging subsection comprising one or more lenses to receive scattered light from the target object and to deliver the scattered light to a sensor; and
a linear variable filter positioned to receive the scattered light prior to reaching the sensor and to selectively pass therethrough a portion of the light having a particular spectral range of wavelengths as a function of a position of the light that is incident thereon, wherein the light delivered to the target object comprises a plurality of light sheets having spectrally dispersed chromatic sections that are positioned across the light sheet, and wherein the spectrally dispersed chromatic sections spread contiguously across each light sheet.

* * * * *